United States Patent [19]

Lawson

[11] 4,356,973
[45] Nov. 2, 1982

[54] THRUST REVERSER GEARED LINKAGE

[75] Inventor: Dale W. R. Lawson, Bonita, Calif.

[73] Assignee: Rohr Industries, Inc., Chula Vista, Calif.

[21] Appl. No.: 166,316

[22] Filed: Jul. 7, 1980

[51] Int. Cl.³ .............................................. F02K 1/62
[52] U.S. Cl. ............................ 239/265.31; 60/226 A; 244/110 B; 74/31; 74/109
[58] Field of Search ................ 244/110 B, 23 D, 12.5, 244/213, 90 A; 239/265.31, 265.27, 265.29; 60/226 A, 230, 262; 74/109, 30, 31

[56] References Cited

U.S. PATENT DOCUMENTS

| | | | |
|---|---|---|---|
| 1,465,702 | 8/1923 | Wile | 74/31 |
| 2,383,102 | 8/1945 | Zap | 244/213 |
| 2,931,171 | 4/1960 | Tyler et al. | 239/265.31 |
| 3,500,646 | 3/1970 | Hem et al. | 60/226 A |
| 3,665,709 | 5/1972 | Medawar et al. | 60/226 A |
| 4,030,291 | 6/1977 | Sargisson | 239/265.31 |
| 4,073,440 | 2/1978 | Hapke | 244/110 B |

*Primary Examiner*—Galen L. Barefoot
*Attorney, Agent, or Firm*—Patrick J. Schlesinger; Frank D. Gilliam

[57] ABSTRACT

A thrust reverser for the gas stream of a fan jet engine. The engine having a surrounding cowl which forms a fan duct therewith that is divided into a forward fixed and an aft translatable section. The thrust reverser mechanism comprises the plurality of blocker doors rotatable in and out of the fan duct. The rotation mechanism of each of the blocker doors comprises a pinion gear rotatable about a central axle which engages the teeth of a pair of opposing gear racks, one gear rack is attached to the forward cowl section and the other is attached to and carried by the aft cowl section and at least one link member pivotably connected at one end to the axle and at the other end to one of the blocker doors. The translation of the aft cowl section causes said blocker doors to rotate in and out of the fan duct and expose and cover gas reversing cascades.

6 Claims, 6 Drawing Figures

U.S. Patent  Nov. 2, 1982  Sheet 1 of 2  4,356,973
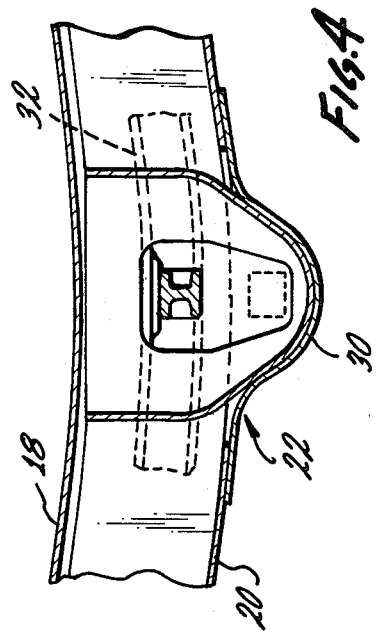
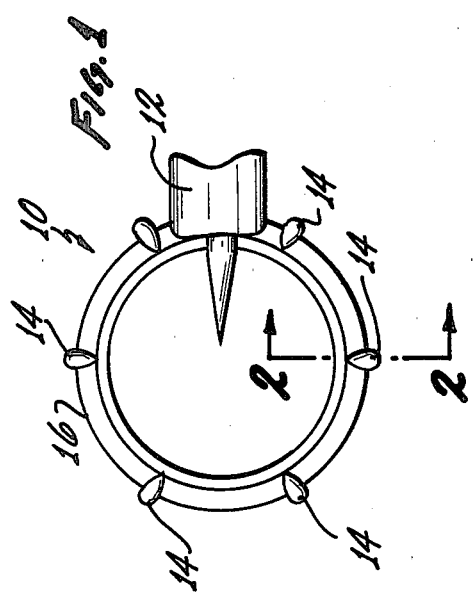
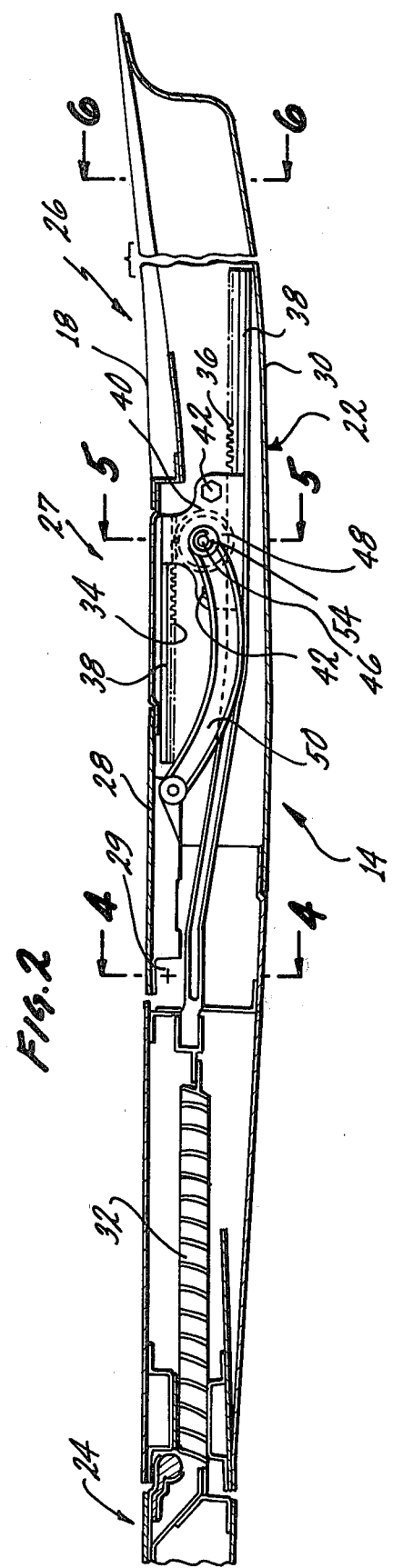

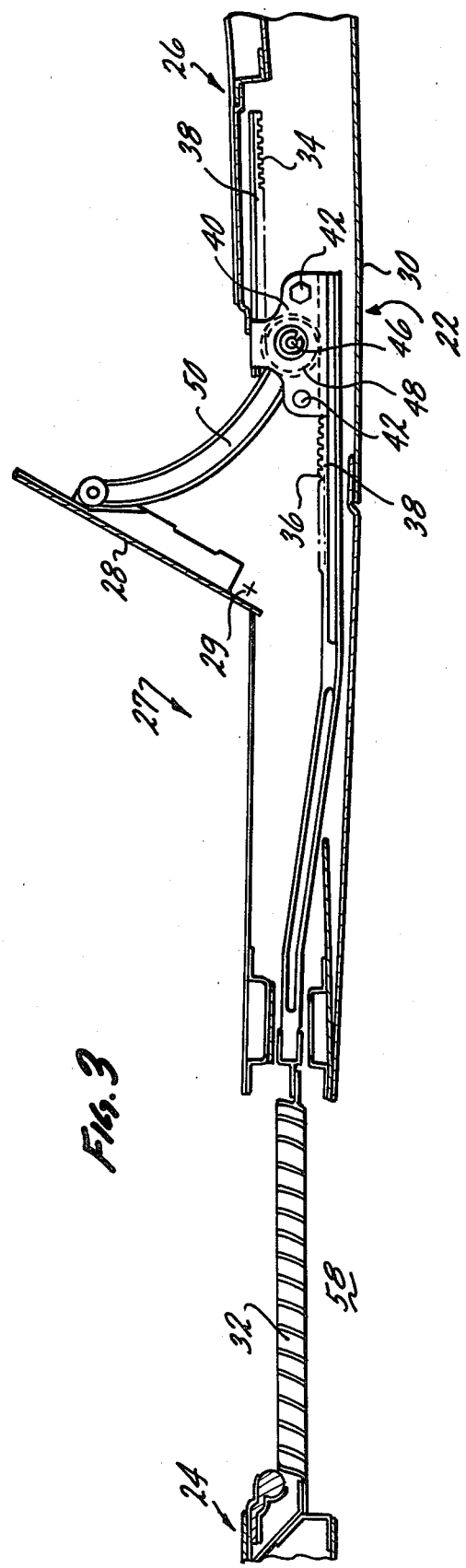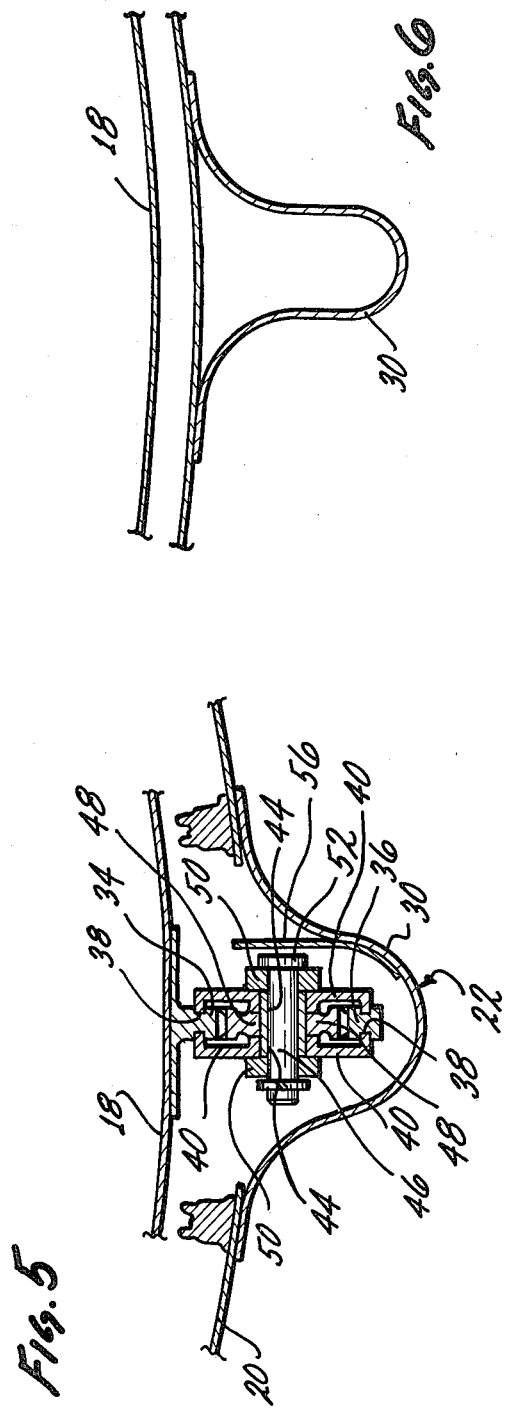

THRUST REVERSER GEARED LINKAGE

BACKGROUND OF THE INVENTION

The invention relates to the thrust reversing of aircraft gases and more specifically to the reversing of fan gases of a turbofan engine.

Various types of fan gas reversers now exist, most of which are considered successful for their intended purpose. Some of these prior art reversers utilize cowl section translation to provide deployment of the reverser or blocker doors as well as to provide an opening intermediate to the longitudinal boundaries of the cowl to provide a forward directed exit for the reversing of the gas flow.

An actuation mechanism generally consists of links and actuators for both translation and deployment. A novel two-part door is taught in U.S. Pat. No. 4,073,440, where the abutting end of the doors include gears. One door is rotated by linear actuator and the other is rotated by the meshing of the gears.

As mentioned, all of these have various merits and have been used successfully. The principle objections have been cost, weight, and complexity with resultant high maintenance and little consideration toward maintaining excess area size balance during deployment of the doors to prevent loading and stalling of the engine.

SUMMARY OF THE INVENTION

The present invention obtains the benefits mentioned above while providing an apparatus that has a positive action, has reduced weight, and maintains engine pressure balance during deployment.

Generally stated, in the presently preferred form, the apparatus includes an elongated streamline cowl around the engine and radially spaced therefrom to form a fan air duct therebetween. The aft cowl section is translatable rearward to form an opening between the cowl sections for the exit of the forward directed fan gases. A plurality of blocker or reverser doors are carried by the aft cowl section and are rotated into the fan duct by two link members having one of their ends pivotly attached thereto with the other end of each link member pivotly attached to opposite ends of an axle shaft of a pinion gear. The pinion gear engages two opposing gear racks, one rack is attached to the translatable aft section and the other rack is attached to the forward fixedly positioned cowl section. The translation of the cowl section causes the pinion gear to rotate, causing the links to translate and rotate the doors in or out of the fan duct depending on the direction of cowl section translation.

BRIEF DESCRIPTION OF THE DRAWINGS

Various other advantages and features of novelty will become apparent as the description proceeds in conjunction with the accompanying drawings in which:

FIG. 1 is a showing of an aircraft engine, looking forward, employing the instant invention.

FIG. 2 is a longitudinal cross-sectional showing of a portion of the engine cowl along line 2—2 of FIG. 1 including the apparatus of the instant invention in a stowed position.

FIG. 3 is a showing of the apparatus of FIG. 1 shown in a fully deployed position.

FIG. 4 is the showing of FIG. 2 taken along line 4—4.
FIG. 5 is a showing of FIG. 2 taken along line 5—5.
FIG. 6 is a showing of FIG. 2 taken along line 6—6.

DESCRIPTION OF THE PREFERRED EMBODIMENTS

The same reference numerals are used throughout the specification to depict the same or identical part or element.

FIG. 1 depicts a fan jet aircraft engine 10 looking aft to forward, mounted to the aircraft (not shown) by well known attachment means 12. A fairing 14 is shown that provides a streamline covering for the operational mechanism of the apparatus.

FIG. 2 is the partial section of the cowl taken along line 2—2 of FIG. 1, showing the operating mechanism of the apparatus of the instant invention. The operating mechanism is totally concealed within the cowl 16 between the inner and outer airflow surfaces 18, 20, respectively and the fairing outer surface 22. The fairing 14 is divided into two sections (see FIGS. 4 and 5). A forward cowl section 24 (see FIG. 2) is attached to aircraft structure in a fixed position and an aft cowl section 26 which is translatable rearward with respect to the forward cowl section 24. When the reverser or blocker door 28 is in a stowed position, as shown in FIG. 2, the inner surface 18 of the forward cowl 24, the reverser or blocker doors 28, and the aft cowl 26 form the outer fan gas flow boundary. The outer cowl surface 20 (see FIG. 5) and the outer surface 30 of fairing 22 form the flow boundaries for the air passing along the outside of the aircraft engine during flight. A cascade ring 32 nests between the inner and outer surfaces 18, 20, of the aft cowl section 26 when the aft cowl section is in its forward stowed position (FIG. 1). The cascade ring 32 is fixedly attached to the forward cowl section 24.

Each blocker or reverser door 28, typically five or more are utilized, each having a hingeline 29 and a deploying mechanism. This mechanism comprises a pair of gear racks 34, 36, each having teeth along one surface. Gear rack 34 is carried by the aft cowl section 26 and translates therewith. Gear rack 36 is attached to the forward cowl section 24 through the cascade ring 32. Each gear rack has grooves 38 along each side thereof for engaging a slider assembly 40. The slider assembly 40 is constructed in two halves. One slider half is positioned in a groove 38 engaging relationship on each side of the racks.

A pair of fasteners 42 pass through the slider halves and secure the slider assembly to the racks. Each slider half has an aperture 44 therethrough transverse to its direction of translation. These apertures 44 accept and hold an axle or link pin 46 passing therein.

Positioned on the axle or link pin 46 between the slider halves is a pinion gear 48 for engaging the teeth on each of opposing gear racks. Door links 50 are positioned on each outside surface of the slider halves. One end of each of the door links 50 is carried by the axle or link pin 46 and is rotatable thereon. One end of the axle or link pin 46 shown includes a shoulder 52 which is larger in diameter than the apertures 44, thereby preventing the axle or link pin 46 from passing entirely through the apertures 44. The opposite end of the axle or link pin 46 has a countersunk groove thereround, not shown, for receiving a keeper means 54 therein. This keeper means 54 initially prevents the axle or link pin 46 from becoming detached from the slider halves. Additionally, a safety feature 56, see FIG. 5, is an axle or link pin safety stop attached to the fairing 22 to prevent the accidental removal of the axle or link pin 46 from the slider half apertures 44 in the event the keeper 54 should become disengaged from the axle or link pin.

The links 50 are curvilinear and bowed in an inward direction toward the engine center line with their ends opposite the axle or link pin 46 attachment pivotally attached to their associated one reverser door 28. Any pivotable attachment may be employed at the blocker door link attachment and the pivotable attachment may also be provided with a similar axle for link pin safety stop 56.

It should be noted that the link 50 to door 28 attachment is adjacent the inner door surface, while the axle or link pin is substantially centrally located between the cowl inner and outer surfaces, thus the door link connection is nearer the engine center line than the axle or link pin connection.

Referring now to FIG. 3 in detail. This figure shows the aft cowl section 26 translated to its maximum deployed (aft) position. This translation is accomplished by a plurality of linear actuator means, or the like (not shown), that provide the required uniformity of cowl section translation. As can be readily seen, the slider assembly 40 is translated to the aft end of the fixed gear rack 36, and the gear rack 34 carried by the aft cowl section 26 has likewise translated aft, thereby, positioning the slider assembly 40 at the extreme forward end of this gear rack 34. The aft translation of the cowl section 26 provides an opening 58 between the forward and aft cowl sections 24, 26, exposing the cascade ring 32 therein.

FIGS. 3 through 6 show sectional views of the various portions of the fairing 14, exposing the operational components of the reverser mechanism therein in their stowed FIG. 1 position. It should be understood that because one rack translates with the cowl section, the door pivots actually travel approximately twice the distance that the slider assembly translates. This feature and the curvilinear inward bowed links insures that the link rotate inward, deploying the blocker doors when the cowl section translates rearward, and returns the doors to their stowed positions when the translatable cowl section is returned to its maximum forward position.

It will be apparent that the invention described above provides apparatus which performs the desired thrust reversing function very effectively and with the minimum number of components arranged so that they can be concealed within the cowling and fairing structure. The construction being simple and rugged for low cost and maintenance expense.

What is claimed as new and useful and desired to be secured by U.S. Letter Patent is:

1. An improved thrust reversing apparatus for reversing the gas stream of a fan jet engine having a primary plug surrounded by cowl and forming a duct therebetween, said cowl having a fixedly positioned forward section and an aft translatable section comprising:

a plurality of rotatable blocker doors associated with the aft translatable cowl section for substantially reversing the normal rearward flow of said gas stream when rotated to a deployed position and defining a portion of the duct when in a stowed position; and mechanism for rotating each of said plurality of blocker doors, said mechanism comprising a pinion gear rotatable about an axle shaft, a pair of opposing gear racks for engagement with said pinion gear, one of said gear racks fixedly attached to the forward cowl section, and the other gear rack carried by said aft translatable cowl section, and at least one link member pivotably attached at one end to said axle shaft and at the other end to one of said plurality of blocker doors, whereby the translation of said aft translatable cowl section rotates said pinion gear on said racks about said axle shaft causing said at least one link member to rotate its associated blocker door into said duct.

2. The invention as defined in claim 1 wherein two link members are utilized, one positioned on each end of said axle shaft.

3. The invention as defined in claim 1 wherein at least one link member is curvilinearly bowed inward toward said fan duct.

4. The invention as defined in claim 1 wherein said at least one link member to blocker door attachment is nearer to the engine centerline than the link axle shaft attachment.

5. The invention as defined in claim 1 wherein said gear racks have tracks along the sides thereof and said pinion gear is carried by a slider means engaging said tracks.

6. The invention as defined in claim 1 wherein gas turning cascades reverse the gas flow and support the forward cowl section.

* * * * *